(12) United States Patent
Leach et al.

(10) Patent No.: US 7,306,869 B2
(45) Date of Patent: Dec. 11, 2007

(54) ELECTROSTATICALLY ACTUATED SHUTTER AND ARRAY FOR USE IN A DIRECT OXIDATION FUEL CELL

(75) Inventors: David H. Leach, Albany, NY (US); Charles M. Carlstrom, Jr., Saratoga Springs, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 619 days.

(21) Appl. No.: 10/726,162

(22) Filed: Dec. 2, 2003

(65) Prior Publication Data

US 2005/0118469 A1    Jun. 2, 2005

(51) Int. Cl.
*H01M 8/04* (2006.01)

(52) U.S. Cl. .................. 429/34; 429/23; 137/623.5

(58) Field of Classification Search ............ 429/17, 429/34, 35, 23; 347/136; 720/738, 1; 396/64, 396/169, 452, 1; 399/3; 352/1
See application file for complete search history.

(56) References Cited

U.S. PATENT DOCUMENTS

| | | | |
|---|---|---|---|
| 3,797,919 A * | 3/1974 | McClenahan | 359/231 |
| 3,951,051 A | 4/1976 | Dry | |
| 4,177,327 A * | 12/1979 | Mathews et al. | 429/27 |
| 4,478,917 A | 10/1984 | Fujita et al. | |
| 4,562,123 A | 12/1985 | Shimizu et al. | |
| 4,612,261 A | 9/1986 | Tsukui et al. | |
| 4,889,163 A | 12/1989 | Engelbertsson | |
| 4,892,288 A | 1/1990 | Norbury et al. | |
| 5,323,102 A | 6/1994 | Torii et al. | |
| 5,409,785 A | 4/1995 | Nakano et al. | |
| 5,541,016 A * | 7/1996 | Schumm, Jr. | 429/27 |
| 5,573,866 A | 11/1996 | Van Dine et al. | |
| 5,723,228 A | 3/1998 | Okamoto | |
| 5,773,162 A * | 6/1998 | Surampudi et al. | 429/39 |
| 5,795,668 A | 8/1998 | Banerjee | |

(Continued)

FOREIGN PATENT DOCUMENTS

EP    1 274 144 A2    1/2003

(Continued)

*Primary Examiner*—Mark Ruthkosky
(74) *Attorney, Agent, or Firm*—Cesari and McKenna LLP (57) ABSTRACT

A wide-area electrostatically-actuated shutter is provided that includes a thin, flexible, diaphragm that is placed between two rigid electrode structures. In one embodiment of the invention, the diaphragm has a set of openings in it. These openings overlap with corresponding openings in one of the rigid electrodes such that when the diaphragm is contiguous to that electrode, the openings provide apertures through which vaporous fuel can flow. The opposite electrode does not have overlapping openings, thus it forms a seal that prevents gas or vapor from passing through it when the diaphragm is in contact with the opposite electrode. The shutter is actuated electrostatically by an associated driver that applies a voltage to the diaphragm such that when the high voltage is applied to the diaphragm, the diaphragm is attracted to the fixed electrode that is tied to ground. Alternatively, when is desired to place the shutter in the opposite position, the diaphragm is placed at ground, which, in turn, pulls it towards the fixed electrode that is at a high voltage, to adjust the shutter. The shutter can be rapidly opened and closed at a high frequency in a PWM mode or a PFM mode.

7 Claims, 10 Drawing Sheets

U.S. PATENT DOCUMENTS

| | | | |
|---|---|---|---|
| 5,837,394 A * | 11/1998 | Schumm, Jr. | 429/27 |
| 5,863,310 A | 1/1999 | Brown et al. | |
| 5,925,476 A | 7/1999 | Kawatsu | |
| 6,024,848 A | 2/2000 | Dufner et al. | |
| 6,130,175 A | 10/2000 | Rusch et al. | |
| 6,179,586 B1 | 1/2001 | Herb et al. | |
| 6,265,093 B1 | 7/2001 | Surampudi et al. | |
| 6,296,964 B1 | 10/2001 | Ren et al. | |
| 6,350,540 B1 | 2/2002 | Sugita et al. | |
| 6,361,892 B1 | 3/2002 | Ruhl et al. | |
| RE37,656 E | 4/2002 | Bahar et al. | |
| 6,420,059 B1 | 7/2002 | Surampudi et al. | |
| 6,443,717 B1 | 9/2002 | Barber | |
| 6,458,479 B1 | 10/2002 | Ren et al. | |
| 6,506,513 B1 | 1/2003 | Yonetsu et al. | |
| 6,509,112 B1 | 1/2003 | Luft et al. | |
| 6,551,731 B1 | 4/2003 | Berg et al. | |
| 6,554,591 B1 | 4/2003 | Dai et al. | |
| 6,596,422 B2 | 7/2003 | Ren | |
| 6,981,877 B2 | 8/2003 | Ren et al. | |
| 6,612,828 B2 * | 9/2003 | Powers et al. | 425/145 |
| 6,632,553 B2 | 10/2003 | Corey et al. | |
| 6,703,152 B2 | 3/2004 | Komiya et al. | |
| 6,808,838 B1 | 10/2004 | Wilson | |
| 6,811,905 B1 | 11/2004 | Cropley et al. | |
| 6,887,615 B1 * | 5/2005 | Sherman et al. | 429/61 |
| 6,935,609 B2 * | 8/2005 | Sherman et al. | 251/76 |
| 6,962,170 B1 * | 11/2005 | Sherman et al. | 137/625.33 |
| 6,981,520 B2 * | 1/2006 | Sherman et al. | 137/625.33 |
| 7,066,205 B2 * | 6/2006 | Sherman et al. | 137/625.33 |
| 2001/0022351 A1 | 9/2001 | Kremer | |
| 2002/0155341 A1 | 10/2002 | Finkelshtain et al. | |
| 2003/0162070 A1 | 8/2003 | Hirsch et al. | |
| 2004/0209133 A1 | 10/2004 | Hirsch et al. | |
| 2004/0265657 A1 | 12/2004 | Beckmann et al. | |
| 2005/0118469 A1 | 6/2005 | Leach et al. | |

FOREIGN PATENT DOCUMENTS

| | | |
|---|---|---|
| SU | 1610522 A1 | 11/1990 |
| WO | WO 97/50140 A1 | 12/1997 |
| WO | WO01/09520 A1 * | 2/2001 |
| WO | WO 03/026035 A2 | 3/2003 |
| WO | WO 03/026035 A3 | 3/2003 |
| WO | WO 03/077345 A1 | 9/2003 |

* cited by examiner

ELECTROSTATICALLY ACTUATED SHUTTER AND ARRAY FOR USE IN A DIRECT OXIDATION FUEL CELL

BACKGROUND OF THE INVENTION

1. Field of the Invention

This invention relates generally to fuel cell systems, and more particularly, to control of vapors and gases involved in the operation of the fuel cell system.

2. Background Information

Fuel cells are devices in which an electrochemical reaction involving a fuel molecule is used to generate electricity. A variety of compounds may be suited for use as a fuel depending upon the specific nature of the cell. Organic compounds, such as methanol or natural gas, are attractive fuel choices due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Many currently developed fuel cells are reformer-based systems. However, because fuel processing is complex and generally requires components which occupy significant volume, reformer based systems are presently limited to comparatively large, high power applications.

Direct oxidation fuel cell systems may be better suited for a number of applications in smaller mobile devices (e.g., mobile phones, handheld and laptop computers), as well as in some larger scale applications. In many direct oxidation fuel cells, a carbonaceous liquid fuel (typically methanol or an aqueous methanol solution) is introduced to the anode face of a membrane electrode assembly (MEA).

One example of a direct oxidation fuel cell system is a direct methanol fuel cell system, or DMFC system. In a DMFC system, methanol or a mixture comprised of methanol and water is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water.

Typical DMFC systems include a fuel source, fluid and effluent management sub-systems, and air management sub-systems, in addition to the direct methanol fuel cell itself ("fuel cell"). The fuel cell typically consists of a housing, hardware for current collection and fuel and air distribution, and a membrane electrode assembly ("MEA"), which are all typically disposed within the housing.

The electricity generating reactions and the current collection in a direct oxidation fuel cell system take place within and on the MEA. In the fuel oxidation process at the anode, the products are protons, electrons and carbon dioxide. Protons (originating from fuel and water molecules involved in the anodic reaction) migrate through the catalyzed membrane electrolyte, which is impermeable to the electrons. The electrons travel through an external circuit, which includes the load, and are united with the protons and oxygen molecules in the cathodic reaction, thus providing electrical power from the fuel cell and water product at the cathode of the fuel cell.

A typical MEA includes a centrally disposed protonically-conductive, electronically non-conductive membrane ("PCM", sometimes also referred to herein as "the catalyzed membrane"). One example of a commercially available PCM is Nafion® a registered trademark of E.I. Dupont de Nemours and Company, a cation exchange membrane based on polyperflourosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer on the anode side is employed to evenly distribute the fuel mixture across the catalyzed anode face of the PCM, while allowing the gaseous product of the reaction, typically carbon dioxide, to move away from the anode face of the PCM. In the case of the cathode side, a wet-proofed diffusion layer is used to allow a sufficient supply of oxygen by minimizing or eliminating the build-up of liquid, typically water, on the cathode aspect of the PCM. Each of the anode and cathode diffusion layers also assists in the collection and conduction of electric current from the catalyzed PCM.

Direct oxidation fuel cell systems for portable electronic devices should be as small as possible at the power output required. The power output is governed by the rate of the reactions that occur at the anode and the cathode of the fuel cell. More specifically, the anode process in direct methanol fuel cells based on acidic electrolytes, including polyperflourosulfonic acid and similar polymer electrolytes, involves a reaction of one molecule of methanol with one molecule of water. In this process, the oxygen atom in the water molecule is electrochemically activated to complete the oxidation of methanol to a final $CO_2$ product in a six-electron process, according to the following chemical equation $$CH_3OH + H_2O = CO_2 + 6H^+ + 6e^- \qquad (1)$$

A passive fuel cell system that uses high concentration fuel without the need for external water recirculation loops has been described in commonly-assigned U.S. patent application Ser. No. 10/413,983 filed on Apr. 15, 2003 by Ren et al. for a DIRECT OXIDATION FUEL CELL OPERATING WITH DIRECT FEED OF CONCENTRATED FUEL UNDER PASSIVE WATER MANAGEMENT, which is incorporated herein by reference. That application describes a passive direct oxidation fuel cell system that uses a passive mass transport barrier element disposed between the fuel source and the anode aspect of the catalyzed membrane electrolyte. In one embodiment of that invention, the passive mass transport barrier is described as a methanol vapor delivery film.

Another method and apparatus for delivering a vaporous fuel to a direct oxidation fuel cell was described in commonly-assigned U.S. patent application Ser. No. 10/688,433 filed on Oct. 17, 2003 by Becerra et al. for a FUEL SUBSTANCE AND ASSOCIATED CARTRIDGE FOR FUEL CELL, which is incorporated herein by reference, which describes a unique fuel substance to which a thickening agent is added to form a gel fuel. When the gel fuel is placed in a fuel refill, a highly concentrated vaporous fuel substance is delivered to a fuel cell or array of fuel cells and the associated fuel cell system. In such applications, one goal is to deliver sufficient fuel for operation to each fuel cell, and may be accomplished by feeding the fuel perpendicular to the major surface of the MEA (known as "face feeding"). Another benefit of face feeding is to maximize the even distribution of the fuel to the active anode aspect of the catalyzed membrane.

However, the rate at which fuel is delivered using face feeding fuel delivery systems is difficult to control using methods known in the art. In addition to providing an even distribution of fuel, the correct amount of fuel delivered is also important to control because the efficiency of a direct methanol fuel cell is dependent in part upon the amount of methanol present at the anode catalyst. If more methanol is present than is needed for electricity generation, the excess will not be used for electricity generation, but instead passes through the catalyzed membrane. When excess methanol crosses over the catalyzed membrane, it reacts with oxygen in the presence of the catalyst present on the cathode side, generating heat and water. This reaction is normally not desirable as it leads to the waste of fuel. In addition, excess water may result in cathode flooding, which inhibits the introduction of oxygen to the cathode aspect of the fuel cell, thus limiting the performance of the fuel cell system. Furthermore, excess heat can diminish performance of the fuel cell and fuel cell system in both the short and long term. It is further desirable to be able to control the amount of fuel delivered to the fuel cell in response to operating parameters of the system, including but not limited to the current that is demanded from the fuel cell, and ambient environmental conditions. Accordingly, improving control of the flux of methanol that is delivered to the fuel cell system is desirable.

In addition, it is difficult to stop the flow of fuel in present face feed fuel delivery systems, making it difficult to shut the fuel cell and fuel cell system down when necessary or desirable. This may be of import, for example, when a fuel cell is used as a component in a hybrid power source and the battery is fully charged, then it would be advantageous to be able to substantially completely stop the fuel feed. Thus, fuel delivery is interrupted to conserve fuel. It may be further desirable to stop the flow of fuel to the anode aspect of the MEA in response to certain environmental conditions. Some of these disadvantages may also occur in face fed systems that use a liquid fuel feed.

One manner in which fuel delivery can be controlled was described in commonlyowned U.S. patent application Ser. No. 10/413,986 by Hirsch et al. for a VAPOR FEED FUEL CELL SYSTEM WITH CONTROLLABLE FUEL DELIVERY filed on Apr. 15, 2003, which is incorporated herein by reference. An adjustable fuel delivery regulation assembly is described therein that controls the fuel delivery to the anode aspect of the catalyzed membrane using an adjustable structure that, in one embodiment, includes two correspondingly perforated components that slide with respect to one another, so that when the perforations are lined up apertures are created for fuel flow. When the perforations are completely askew, there are no openings through which fuel can flow. When aligned, fuel may be delivered through the aligned perforations at the maximum rate allowed by the area of the overlapping apertures. It is also possible to orient the perforations in a manner that allows a partial overlap, where the fuel is delivered at a desired rate that corresponds to the degree of overlap of said perforations. The structures are mechanically actuated, and the parts move relative to one another, in some embodiments, externally to the fuel cell system.

However, it may be desirable to provide a mechanism to control face feeding of a direct oxidation fuel cell where the actuation of the shutter does not include externally moving parts, and consumes less volume in the fuel cell, and is less complex mechanically. Mechanical actuators, such as those presently used increase the complexity of the system, and if motors are used to adjust the degree to which a valve is open, they require more power than is desirable. Further, the displacement of the moving parts, including but not limited to a shutter, requires additional space within the fuel cell system. As noted herein, fuel cell systems, particularly direct oxidation fuel cell systems, are particularly suited for small handheld electronic devices in which power requirements and form factors are both critical. Thus, it would be an advantage to have a suitable shutter, which does not require that large portions of the respective components move past each other along a major surface. There are also engineering challenges faced with respect to providing a substantially complete seal between moving parts.

It has otherwise been known to provide piezoelectric or other types of mechanical valves to regulate the flow of fuel into a fuel cell system, however, there are certain undesirable complexities associated with such valve types as well as with the shutters described herein.

Further, there remains a need for regulating the rate at which a vaporous fuel is fed in a vaporous fuel feed in a fuel cell system that is fed using a face feeding system. Accordingly, there remains a need for an apparatus for controlling the amount of fuel that is delivered to the anode aspect of the catalyzed membrane in a direct oxidation fuel cell system that is not mechanically driven and which has fewer moving parts and lower volume than presently available solutions. It is thus an object of the invention to provide a fuel cell system that includes such a mechanism for controlling the rate of delivery of fuel to the fuel cell.

SUMMARY OF THE INVENTION

The disadvantages of prior techniques are overcome by the present invention, which provides a unique, wide area electrostatically-actuated shutter for a fuel cell system. More specifically, the electrostatically-actuated shutter of the present invention includes a thin, flexible, diaphragm comprised of a thin conductive layer sandwiched by thin dielectric layers, disposed between two rigid electrode structures. The diaphragm has a set of apertures that are created using commercially known methods. These openings overlap with corresponding openings formed in one of the rigid electrodes such that when the diaphragm is contiguous to that electrode, the openings provide apertures through which vaporous fuel (or other gases) can flow. The opposite electrode does not have overlapping openings, thus when the diaphragm is held against the opposite electrode, a seal is formed that prevents gas or vapor from passing through.

The shutter is actuated electrostatically when an associated driver applies a first voltage to the diaphragm such that the diaphragm is attracted to one of the fixed electrodes that is held at a different potential. Alternatively, the diaphragm is attracted to the opposite electrode when it is set at the first voltage. Accordingly, the diaphragm is actuated using the electrostatic forces established within the device.

The invention may be embodied in a number of different ways. For example, the shutter may be a structure comprised of a diaphragm that is disposed between two relatively planar electrodes that include features as needed to space the electrodes enough apart to allow the diaphragm to travel, but sufficiently close to allow the electrostatic forces to pull the diaphragm as desired. In another embodiment, the shutter includes fixed electrodes which have a plurality of concave and/or convex features which also aid in providing spacing. In that embodiment of the invention, a first sheet of a rigid, conductive material is molded or stamped to contain a plurality of dome-like cavities that form a first fixed electrode. A second sheet of rigid, conductive material contains a second fixed electrode. The flexible diaphragm is sandwiched between the two electrodes, and the dome-like features in the fixed electrodes accommodate the shape of the flexed diaphragm when it is pulled toward that electrode.

The conductive surfaces may be coated with a thin dielectric layer to prevent shorting where applicable. The rigid electrodes are then bonded together, making the entire unit a self-contained gas/vapor valve, which requires no external support. The electrostatic force is uniform over the surface of the diaphragm so that the flexible diaphragms conform to the rigid electrodes to form a robust seal. This shutter can be placed across a planar array of fuel cells to thereby control and evenly distribute the fuel vapor that is delivered to the anode aspect of the catalyzed membrane. In another embodiment a diaphragm can include open strips that correspond with strips or openings on the electrodes to open and close the shutter. A dual diaphragm configuration and a normally closed configuration are also described.

In accordance with another aspect of the invention the shutter can be used on the cathode side of the direct oxidation fuel cell system to assist in managing the water balance in the fuel cell system, with appropriate design adaptations for the cathode water and oxygen management.

In a direct oxidation fuel cell system, the electrostatically-actuated shutter may be disposed within the fuel cell system itself in the anode vapor chamber, which exists between the fuel source and the anode aspect of the catalyzed membrane electrolyte. If it is so disposed, the action of the diaphragm may assist in mixing the carbon dioxide, water and the fuel substance in the anode gap. Alternatively, the shutter can be disposed within a fuel refill that contains the fuel supply and which can be connected to the fuel cell system.

The frequency of the operation of the electrostatically-actuated shutter can be controlled by an associated driver which applies a voltage to the electrodes and which operates in a pulse-width modulation (PWM) and/or a pulse-frequency modulation (PFM) mode for establishing a temporally uniform feed rate. In this way, the on versus off ratio, i.e. the ratio of time that the valve is open as opposed to closed, of the electrostatically-actuated shutter can be finely tuned to quantitatively control the fuel vapor delivery rate. There are also fully opened or fully closed positions that can be used in appropriate circumstances. The device is a comparatively low power solution for controlling the rate of fuel delivery to the anode aspect of the fuel cell.

BRIEF DESCRIPTION OF THE DRAWINGS

The invention description below refers to the accompanying drawings, of which.

DETAILED DESCRIPTION OF AN ILLUSTRATIVE EMBODIMENT

The illustrative embodiment of the invention is described with reference to a direct oxidation fuel cell, which uses a carbonaceous fuel, such as a highly concentrated methanol vapor as the fuel powering the fuel cell. However, it should be understood that the device of the present invention may be used with other fuel substances such as carbonaceous fuel substantially comprised of alcohol, such as methanol and ethanol, alcohol precursors, dymethyloxylmethane, methylformate or combinations thereof and aqueous solutions thereof, and other carbonaceous substances amenable to use in direct oxidation fuel cells and fuel cell systems. The invention is applicable to face fed systems that may have a vapor feed, or liquid fuel feed and may have passive water management, or active recirculation. The invention is also applicable to other types of fuel cell systems. In addition, the invention is described with reference to use with a planar fuel cell array, but could also be used with an individual fuel cell.

It should be understood that the shutter of the present invention may be embodied in a number of different configurations, but each shutter includes a diaphragm disposed between two fixed electrode components, and the diaphragm has openings that correspond with openings in one of the fixed electrode components, and not the other.

Figure 1:
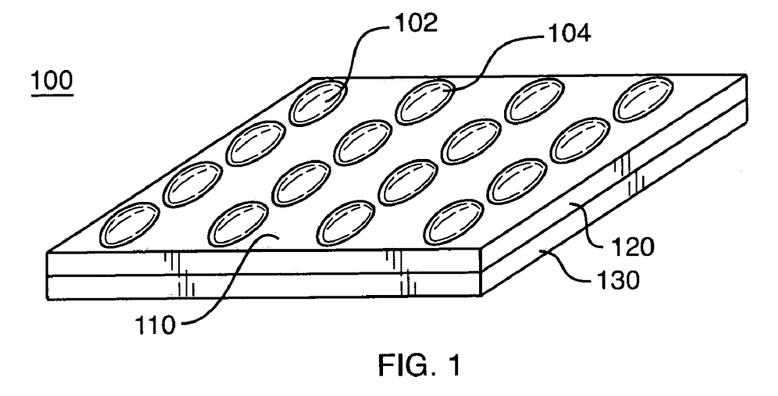
FIG. 1 is an isometric illustration of the electrostatically-actuated shutter of the present invention.
Figure 2:
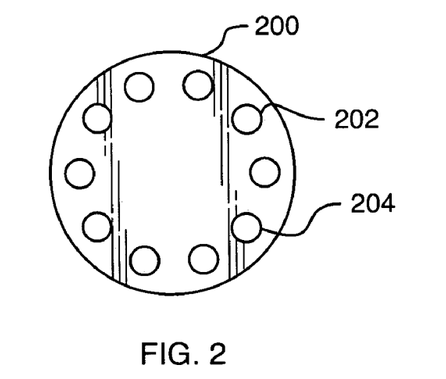
FIG. 2 is a top plan view of a diaphragm for use within the shutter of the present invention.

For example, FIG. 1 is an isometric illustration of the electrostatically-actuated shutter 100 of the present invention. The electrostatically-actuated, wide-area, multiported shutter 100 includes a single diaphragm disposed between two fixed electrodes that have an array of convex structures such as 102 and 104, illustrated in FIG. 1. The overall shape of the convex structures 102, 104 as depicted in FIG. 1 are substantially round, however, each convex structure may be of other geometries, including but not limited to ovals, parallelograms, and irregular shapes, while remaining within the scope of the present invention. One embodiment of the pattern of openings in the diaphragm that would be aligned with a convex structure is shown in FIG. 2. The diaphragm 200 is a thin, flexible, element which is substantially comprised of a dielectric material such as a polyimide, one example of which includes, but is not limited to Kapton® available from E.I. DuPont de Nemours and Company, but there are many other materials, such as Parylene, that may be employed instead within the scope of the invention. Embedded within the dielectric material is a conductive layer that is connected to an electrical driver circuit.

The portion of the diaphragm 200 includes a set of openings, such as the openings 202 and 204. These openings correspond with similarly located openings in a convex structure of one fixed electrode not shown in FIG. 2), as will be described herein. It should be understood, however, that these openings 202, 204 also need not be of a round shape as illustrated, but instead may be of any other suitable shape or shapes, while remaining within the scope of the present invention. Also, more than one diaphragm layer may be incorporated into the shutter so that the two diaphragms are sandwiched between two fixed electrodes, and this is discussed herein with reference to FIGS. 4E and 4F.

Figure 3:
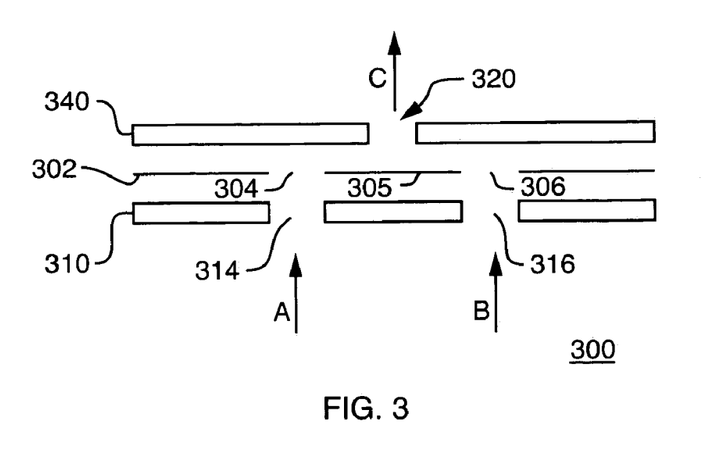
FIG. 3 is a schematic side section of one portion of a shutter in accordance with the present invention.

A portion of the shutter of the present invention is shown schematically in FIG. 3. An electrostatically-actuated shutter portion 300 includes a centrally disposed dielectric diaphragm 302. Openings 304 and 306 in the diaphragm 302 correspond to the openings 202, 204 of FIG. 2. For the purpose of simplicity of illustration, a few openings are shown in the schematic of FIG. 3, but the actual shutter would likely contain a greater number of openings. A first fixed electrode 310 includes corresponding openings 314 and 316 (there would be more in an actual shutter) such that when the diaphragm 302 is pulled towards the first fixed electrode 310, the openings 304, 306 are aligned with the openings in the electrode 314, 316 in such a manner that fuel from the fuel source, can flow in the directions of arrows A and B through the openings in the diaphragm of the shutter to an exit port 320, and towards the anode aspect of the fuel cell in the direction of arrow C. The arrows are for illustrative purposes, and it should be understood that the flow of fluid through the shutter is bidirectional. In the simplified embodiment, just one exit port is illustrated whereas the actual shutter would contain a number of openings that provide a uniform distribution of fuel vapor across the fuel cell array or individual fuel cell in a controlled fashion. In the illustrative embodiment the exit port is located in the opposite fixed electrode 340.

Though the electrodes are represented in FIG. 3 as being a constant distance from each other, where neither touches the diaphragm, it is within the scope of the invention that the electrodes may be of different distances from each other at various points in the shutter and physically contact the diaphragm at one or more points.

As shown in FIG. 3, the second fixed electrode 340 contains the exit port 320, which may comprise a number of openings. Thus, when the diaphragm 302 is pulled to the second fixed electrode 340, the central portion of the diaphragm 305 blocks and thus seals the exit port 320 such that no vapors or gases will flow therethrough. This seals the shutter exit port 320 and prevents the passage of fluid through the assembly. As noted, while FIG. 3 shows only a single exit port 320, and two openings 314, 316, it is contemplated that each array will incorporate multiple exit ports and openings.

The fixed electrodes 310 and 340 are formed in any desirable shape which allows the flexed diaphragm to be pulled toward that electrode and to remain stationary and in good contact in order to provide a seal especially when the shutter is closed, so that gas or vapor is prevented from passing through it. Although the fixed electrodes are shown as flat in the embodiment FIG. 3 for purposes of illustration, the fixed electrodes may be shaped in a variety of other geometries, as described herein.

The fixed electrodes could be comprised of thin sheets of stainless steel, such as 316L stainless steel, and the steel structures may be etched, stamped or otherwise formed as required or desired for a particular embodiment. The metal electrode surfaces may be covered by a thin, dielectric material to avoid shorting the electrodes, and to prevent corrosion. Alternatively, a conductive polymer may be formed using methods known to those skilled in the art to form the openings.

For example, in accordance with a method of the present invention, the fixed electrodes may be formed by hot stamping a nonconductive layer over a conductive hot stamp foil on an injection molded base. Operation steps are to mold the plastic part, hot stamp conductive foil on an area of the non-conductive plastic part to provide for electrostatic actuation. A non-conductive material is then hot stamped over the conductive foil to provide electrical insulation and to prevent corrosion. Then, conductive foil is hot stamped on the area for electrostatic actuation. A non-conductive stamp is then hot stamped over a first stamp to provide electrical insulation and prevent corrosion. The second hot stamp can be replaced with any process that covers the part with a nonconductive coating, such as Parylene.

In the assembly process, the diaphragms are placed within the spaces between the individual electrodes, and the two electrodes 120 and 130 (FIG. 1) are bonded together. Typically, the bonding will be accomplished in the area between the shutters, such as the area designated by the reference character 110 in FIG. 1. The entire resulting structure is relatively thin, on the order of 0.02 inches, and as noted, requires no external support other than perimeter sealing.

Figure 4A:
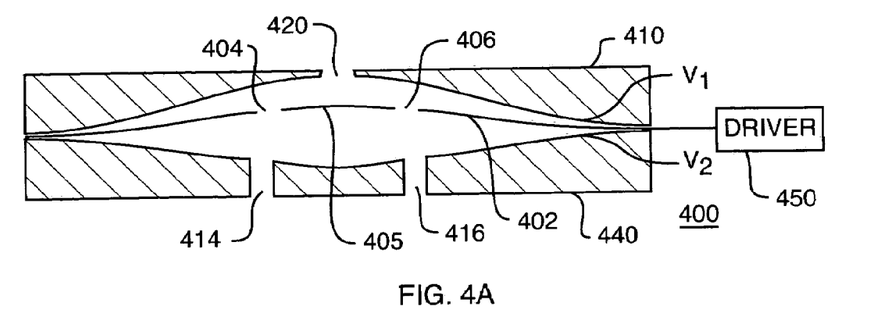
FIG. 4A illustrates, in side section, the domed cavities of the rigid electrodes and the diaphragm of the present invention.
Figure 4B:
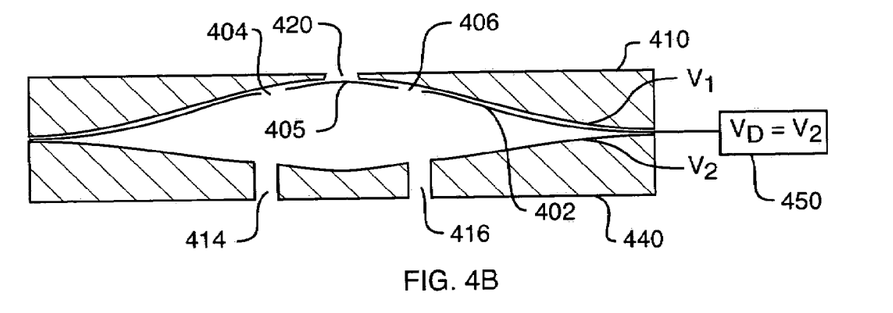
FIG. 4B illustrates the shutter of the present invention in a closed position.
Figure 4C:
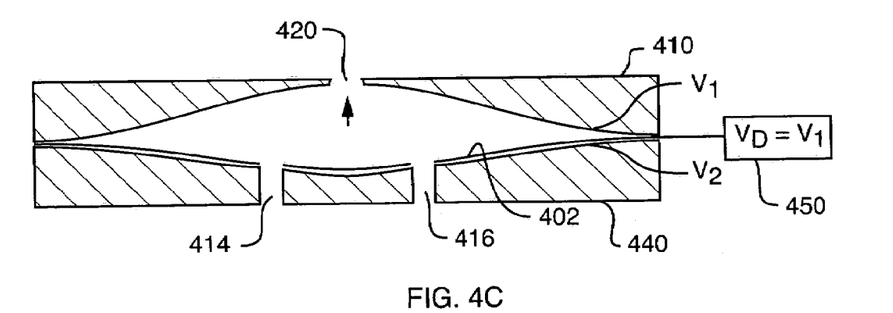
FIG. 4C illustrates the shutter of the present invention in an open position.

The operation of the electrostatically-actuated shutter of the present invention is illustrated in greater detail in FIGS. 4A-4C. For simplicity, actuation is described with respect to one shutter, but it may employed with multiple shutters. As illustrated in FIG. 4A, the shutter 400 includes the centrally-disposed diaphragm 402, which has openings 404 and 406. A first fixed electrode 410 contains the fuel delivery exit port 420. In accordance with the illustrative embodiment of the present invention, the first fixed electrode 410 is electrically connected such that it is at a voltage such as $V_1$. The second fixed electrode 440 has openings 414 and 416 and it is held a separate voltage, $V_2$. The centrally disposed diaphragm 402 is coupled with driver 450, which is capable of applying a voltage to the diaphragm, to establish a voltage differential between the diaphragm and one of the electrodes.

FIG. 4B illustrates the closed position of the shutter of the present invention. The shutter 400 has a first fixed electrode 410 and a second fixed electrode 440. As illustrated in FIG. 4B, a driver 450 sets the voltage of the diaphragm 402, to be equal to $V_2$. In this case, the diaphragm 402 is attracted to the first fixed electrode 410, because it is at the opposite voltage $V_2$. The central portion 405 of the diaphragm 402 thus blocks the fuel delivery exit port 420 and thereby provides a seal against fuel (or other gas) flow through the shutter 400, and thus in the anode embodiment shuts off fuel flow and the shutter 400 is in a closed position.

In FIG. 4C, the driver 450 pulls the diaphragm 402 to $V_1$, which draws the diaphragm 402 to the opposite electrode 440, which is at. $V_2$ Here, the shutter 400 is in an open position allowing fuel vapor or other fluids to flow through.

Figure 4D:
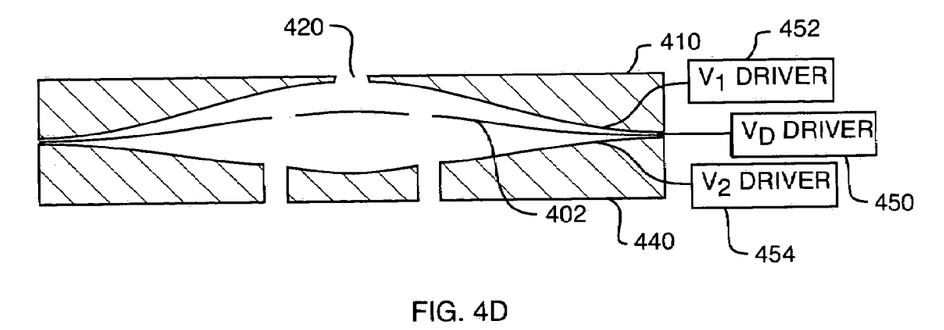
FIG. 4D illustrates another embodiment of the shutter of the present invention in which separate drivers are used to control the voltage of each electrode and of the diaphragm.

In accordance with yet a further aspect of the present invention, illustrated in FIG. 4D, each fixed electrode 410, 440 is connected to its own driver 452, 454, respectively, such that the voltage of each electrode can be changed as desired throughout the operation of the system. If a voltage is applied between the diaphragm and one of the rigid electrodes, an electrostatic attraction force will pull the diaphragm to that electrode. The opposite electrode is driven to the same potential as the diaphragm in order not to have any attractive force. Reversing the potentials between the two rigid electrodes causes the diaphragm to move to the opposite electrode.

Figure 4E:
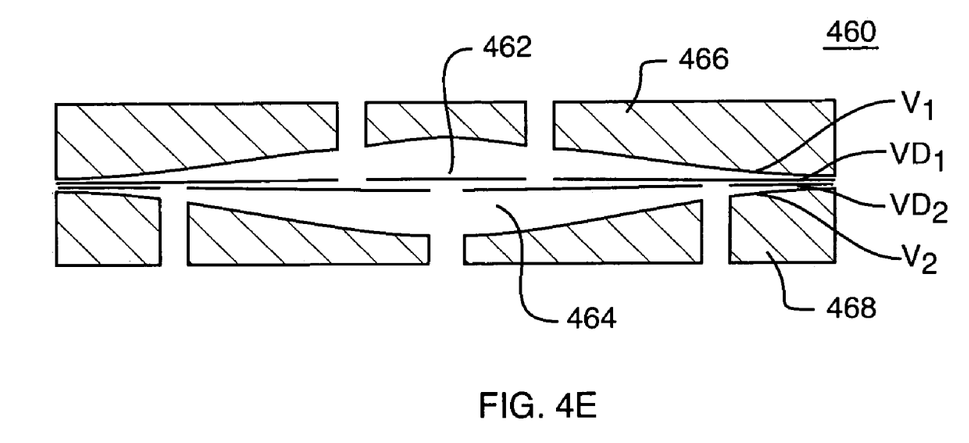
FIG. 4E is a schematic side section of the dual diaphragm configuration of the present invention in a closed position.
Figure 4F:
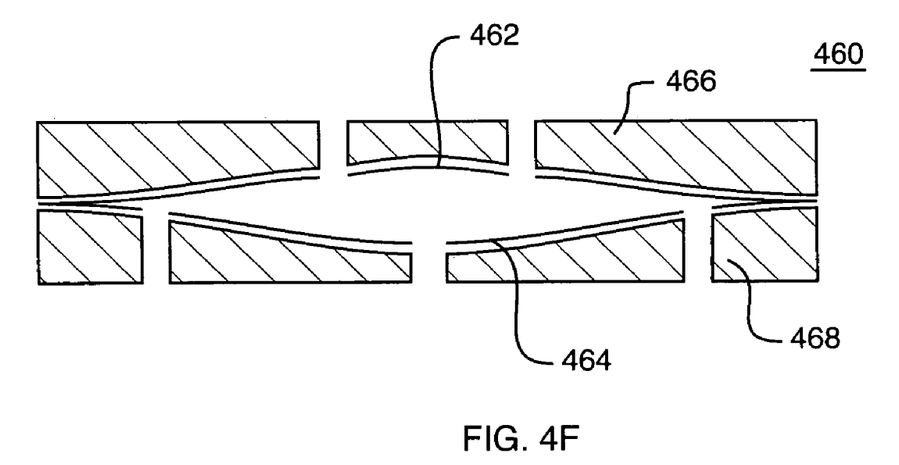
FIG. 4F is a schematic side section of the dual diaphragm configuration of the present invention in an open position.

Various alternative embodiments of the invention will now be described. Referring to FIGS. 4E and 4F, a dual diaphragm configuration is illustrated. The dual diaphragm shutter 460 has two back-to-back diaphragms 462, 464 each with an array of non-overlapping openings. Next to each of the diaphragms is a fixed electrode 466, 468, respectively, which has openings in it that line up with the diaphragm closest to it. When a voltage is applied between the two diaphragms 462 and 464 while connecting each fixed electrode to the same voltage as its nearest diaphragm, the two diaphragms will attract to each other and the shutter will be off, as shown in FIG. 4E. When the two diaphragms 462 and 464 are connected to the same voltage and the outer fixed electrodes are held at a different voltage, each diaphragm will be attracted to its nearest fixed electrode, pulling the diaphragms apart and opening the shutter as shown in FIG. 4F. The advantage of this embodiment is that the seal is diaphragm to diaphragm that is expected to be very good.

Figure 4G:
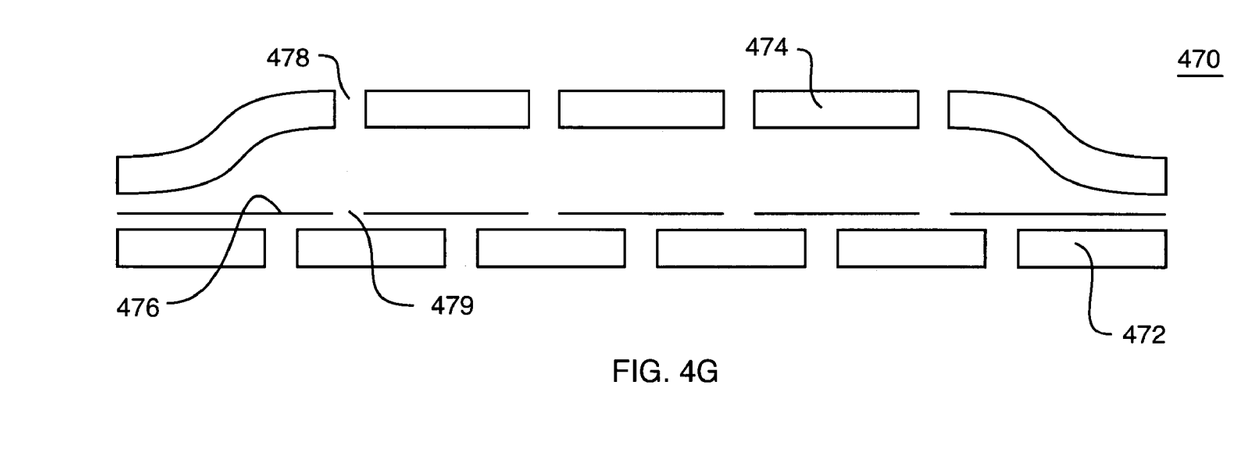
FIG. 4G is a schematic side section of another configuration of the present invention having a normally closed position.

FIG. 4G illustrates another embodiment of the shutter of the present invention in which the shutter is normally closed. The normally closed shutter 470 has a first fixed electrode 472 that is generally flat compared to the second fixed electrode 474, which has a dome-shape. The diaphragm 476 is held in the closed position (as shown) without electricity, with a mechanism or force to hold it in position, i.e., the closed position. Then, when a potential difference is applied between the diaphragm 476 and the electrode 474, the diaphragm is pulled away from the fixed electrode 472 toward the electrode 474 and the openings (e.g., 478, 479) match up to open the shutter 470 and allow the flow of vapors and gases therethrough.

Figure 4H:
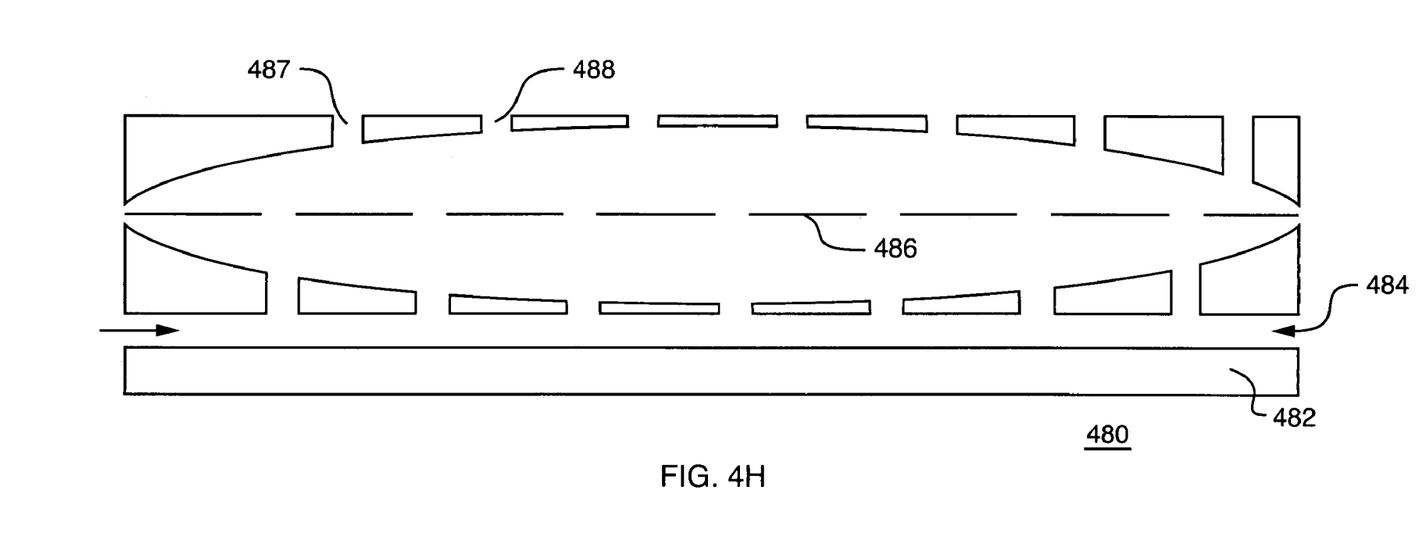
FIG. 4H is a schematic side section of another configuration that shows a large diaphragm with multiple openings capable of covering the entire fuel cell area.

In accordance with another aspect of the invention, the shutter can be designed as a single unit 480 (FIG. 4H) that is placed over the membrane electrode assembly ("MEA") 482 in the vapor chamber 484 of the fuel cell. In this way, the diaphragm 486 can be used to seal the openings 487, 488 and close the vapor chamber to control the flow of fuel to the MEA 482. It should be understood that the MEA 482 includes one or more MEAs disposed on a single plane in an array of fuel cells.

Figure 5A:
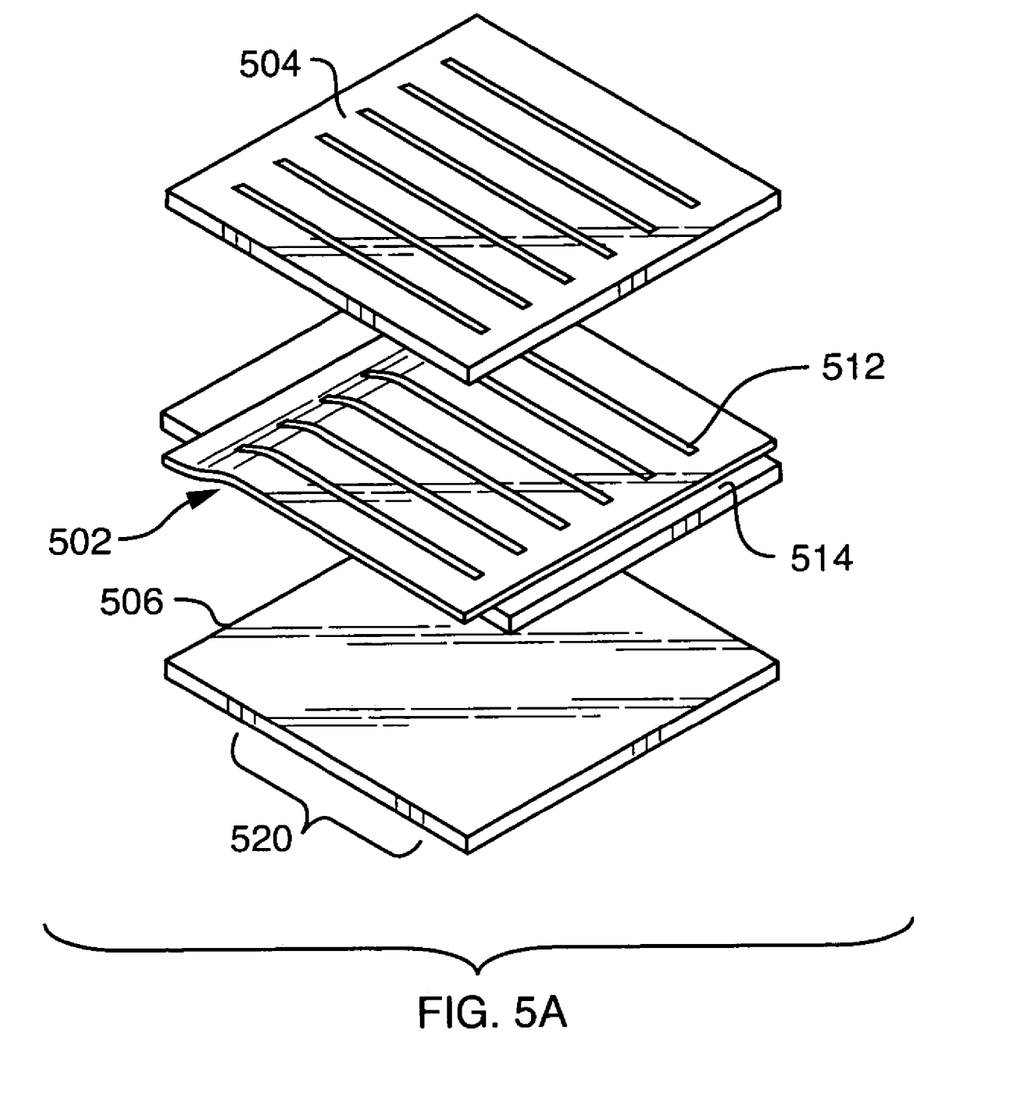
FIG. 5A is an exploded isometric view of a shutter of the present invention that includes a slotted diaphragm that is disposed across standoff features.
Figure 5B:
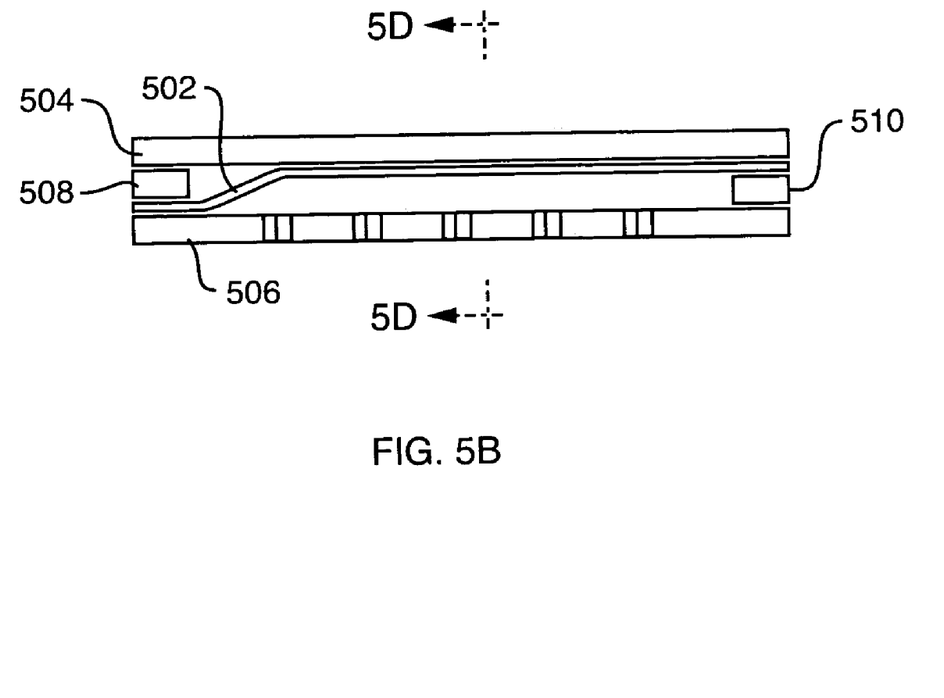
FIGS. 5B and 5C are side sections of the device of FIG. 5A depicting the two positions of the diaphragm.
Figure 5C:
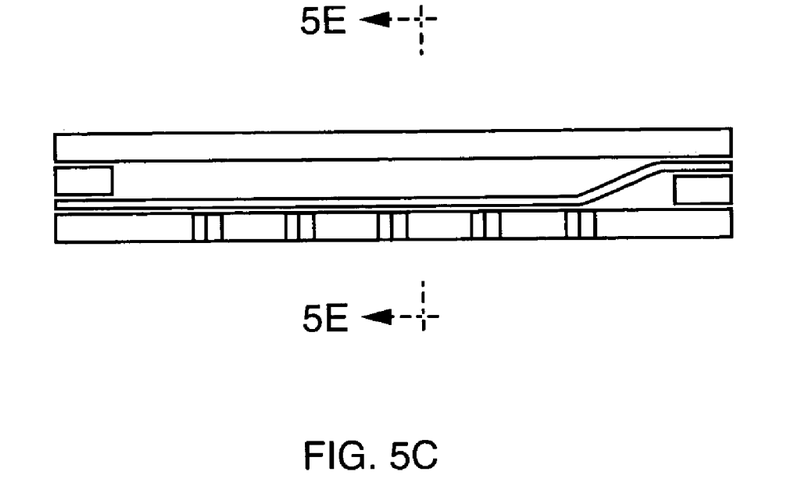

Another embodiment of the invention is illustrated in FIGS. 5A-5E. In FIG. 5A, a diaphragm 502 is sandwiched between a first fixed electrode 504 which is disposed in the embodiment shown on the fuel side of the shutter, and a second fixed electrode 506, which is disposed on the fuel cell side of the shutter. As best illustrated in FIG. 5B, the diaphragm 502 is held close to the fixed electrode 504 at one end 508 and is held close to the other fixed electrode 506 at the other end 510. A plurality of strips, such as the strip 512 covers openings in one of the fixed electrodes but does not cover openings (or slots) in the other fixed electrode. In this configuration, the diaphragm 502 has a high actuation force due to the close proximity of the diaphragm to the attracting electrode. The diaphragm will peel away from the surface it is on to the attracting surface upon actuation starting from the end of the attracting electrode to which it is then held. In the closed state (FIG. 5C) the strips (such as 512, 514) touch the electrode with openings (520) and covers the openings. In the open state (FIG. 5B), the strips 512, 514 touch the opposing electrode 504 and the vapor transports around the sides of the strips through openings (or slots) in the opposing electrode.

Figure 5D:
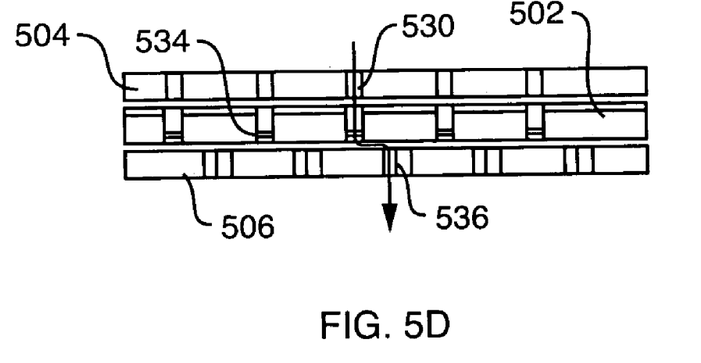
FIG. 5D is a sectional view of the device of FIG. 5A taken along lines A-A of FIG. 5B.

FIG. 5D is a sectional illustration taken along lines A-A of FIG. 5B and it shows the fluid path indicated by the arrow D as opened thus allowing fluid to flow through the slot 534 in the first fixed electrode 534 through an opening 530 in the diaphragm 502, and through an opening 536 in the second fixed electrode 506. It should be understood that there are many such fluid flow paths in the device of FIG. 5D.

Figure 5E:
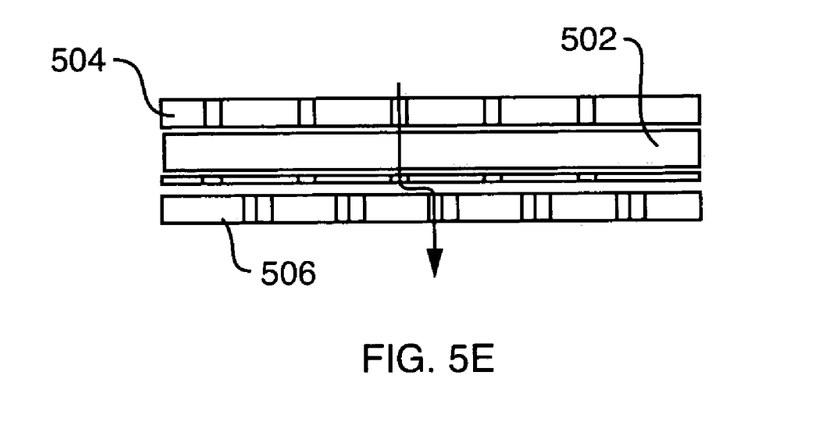
FIG. 5E is a sectional view of the device of FIG. 5A taken along lines B-B of FIG. 5C.

FIG. 5E illustrates the closed position in which the fluid path is block when the diaphragm 502 is positioned to block the openings in the cell side fixed electrode 506.

This embodiment of the invention may also incorporate a dual diaphragm configuration if desired in a particular application of the invention.

Any shutter embodiment can be arranged into an array of separately actuated shutters, (each controlled by its own driver circuit). For example, there could be a separately actuated shutter for each fuel cell in an array and this would allow a control system to balance operation among fuel cells.

The direct methanol fuel cell system may include a hybridizing battery and under most circumstances power to operate the shutter comes from the direct methanol fuel cell system, but there may be instances where the power is obtained from an external source.

The frequency of the operation of the electrostatically actuated shutter can be controlled by an associated device, which operates in a pulse-width modulation (PWM) and/or pulse-frequency modulation (PFM) mode for establishing a temporally uniform feed rate. In this way, the on versus off ratio, i.e., the open versus closed ratio of the electrostatically-actuated shutter can be finely tuned to quantitatively control the fuel vapor delivery rate. There are also full opened or fully closed positions that can be used in appropriate circumstances. The ability of the shutter to actuate quickly and have a large vapor transport area may enable closed loop cell recovery control techniques to be employed. An example of this would include fully opening/actuating the shutter when a low cell voltage is detected. The device is a comparatively low power solution for controlling the rate of fuel delivery to the anode aspect of the fuel cell.

Figure 6A:
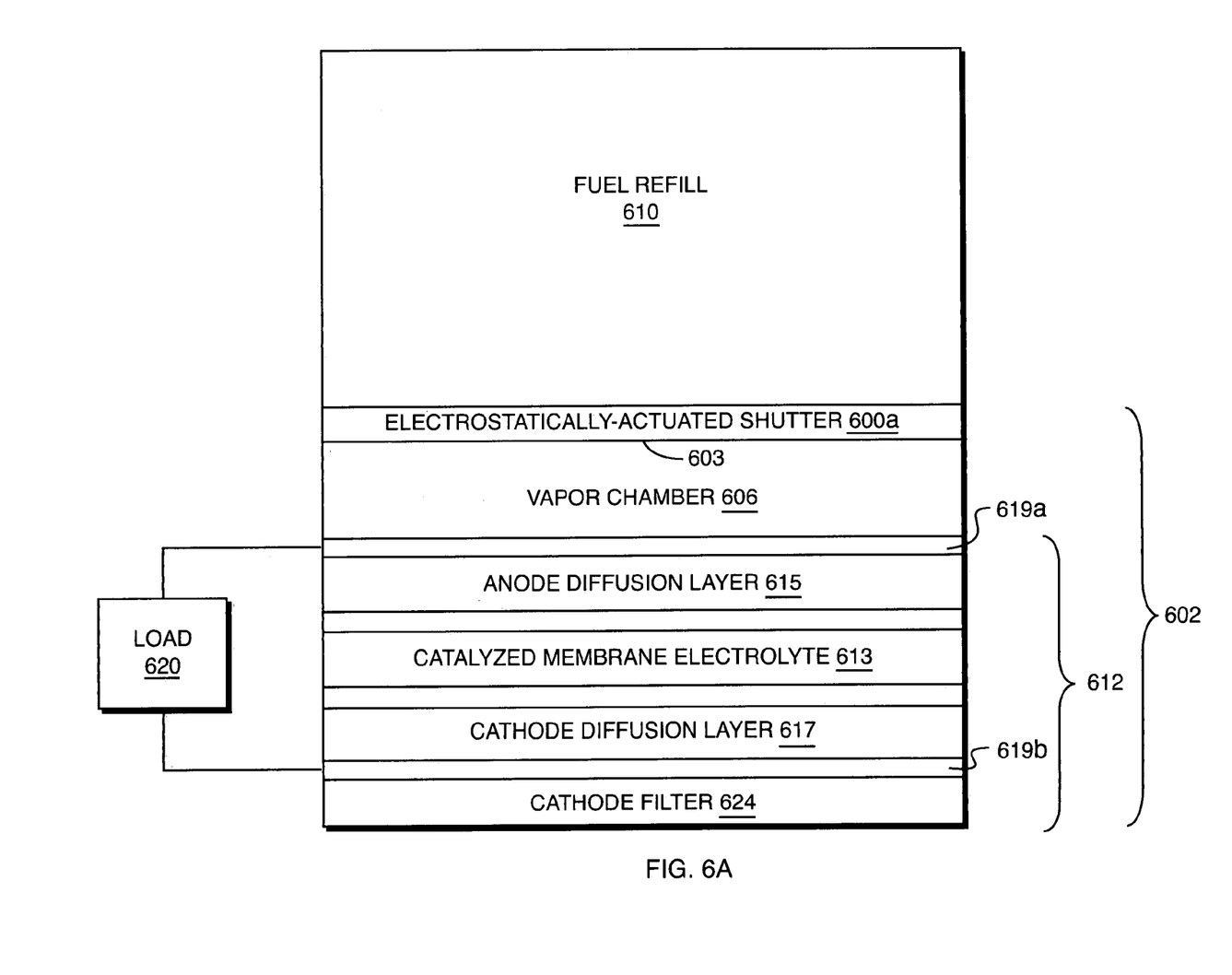
FIG. 6A illustrates a fuel cell system of the present invention incorporating the electrostatically-actuated shutter.

The electrostatically actuated shutter of the present invention can be placed within a fuel cell system and this is illustrated in FIG. 6A. In the illustration of FIG. 6A, the electrostatically-actuated shutter 600a is within a fuel cell system 602 that contains a vapor chamber, for example, 606. The fuel cell 612 has a membrane electrode assembly fabricated using methods and materials known to one skilled in the art. The membrane electrode assembly includes, as discussed herein, a protonically-conductive membrane such as Nafion®. The membrane also includes a catalyst, which is in close proximity and preferably in intimate contact with each of the major surfaces of the membrane thus forming a catalyzed membrane electrolyte 613. Diffusion layers such as anode diffusion layer 615 and cathode diffusion layer 617 may also be included. Current collectors 619A and 619B, typically comprised of an open conductive structure such as a metallic mesh that is used to collect and conduct electrons through a load 620, which utilizes the power produced by the fuel cell 612 as needed in a particular application. An optional cathode filter 624 may also be provided between the cathode of the fuel cell and the ambient environment. The A highly concentrated methanol vapor contained within the fuel refill 610 provides a vaporous fuel feed to the vapor chamber next to anode of the fuel cell 612. The fuel substance may be a methanol vapor or it may be a gel fuel that releases methanol vapor. The rate of this fuel feed is regulated by the electrostatically-actuated shutter 600A of the present invention. The shutter, in turn, can be controlled by an associated device that can be operated in a PWM and/or PFM mode for a controlled temporally uniform feed rate. As the shutter opens and closes, not only does it control the fuel flow through the fuel delivery exit port 603, but it can provide turbulence to aid in stirring the vapor when it is in the vapor chamber 606.

In accordance with yet a further aspect of the present invention, the electrostatically-actuated shutter could have, as one of its fixed electrodes, the anode current collector, for example, 619a. If the anode current collector 619a is at a high voltage compared to the diaphragms within the shutter 600a the electrostatically-actuated diaphragm of the shutter is driven to the anode current collector 619a to thereby close the shutter, or could be drawn to an opposite electrode to open it.

Figure 6B:
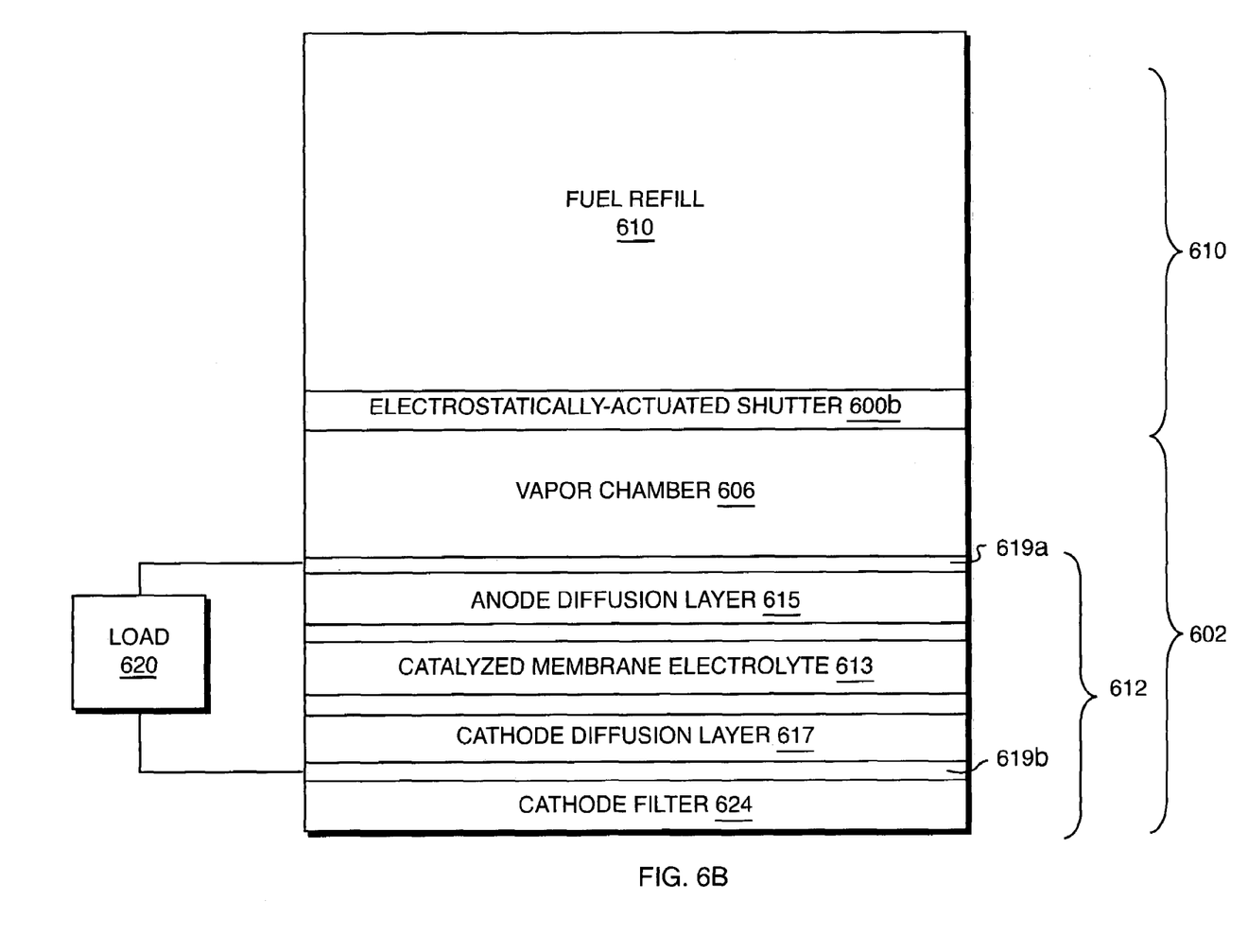
FIG. 6B is a schematic illustration of another embodiment of the present invention in which the shutter is contained within the fuel refill.

Alternatively, there may be circumstances in which it is desirable to manufacture the shutter within the fuel refill. This embodiment of the invention is illustrated in FIG. 6B, in which like components are designated by the same reference characters as in FIG. 6A. In the embodiment of FIG. 6B, the electrostatically-actuated shutter 600b of the present invention is contained within the fuel refill 610. The shutter thus delivers fuel to the vapor chamber 606 in a controlled fashion in accordance with the principles of the invention just described. In addition, however, the shutter can be used to maintain fuel in the refill prior to use and/or it can retain unspent fuel in a fuel refill that is removed after use if the shutter is normally closed or otherwise sealed until it is introduced to the fuel cell system.

Figure 7:
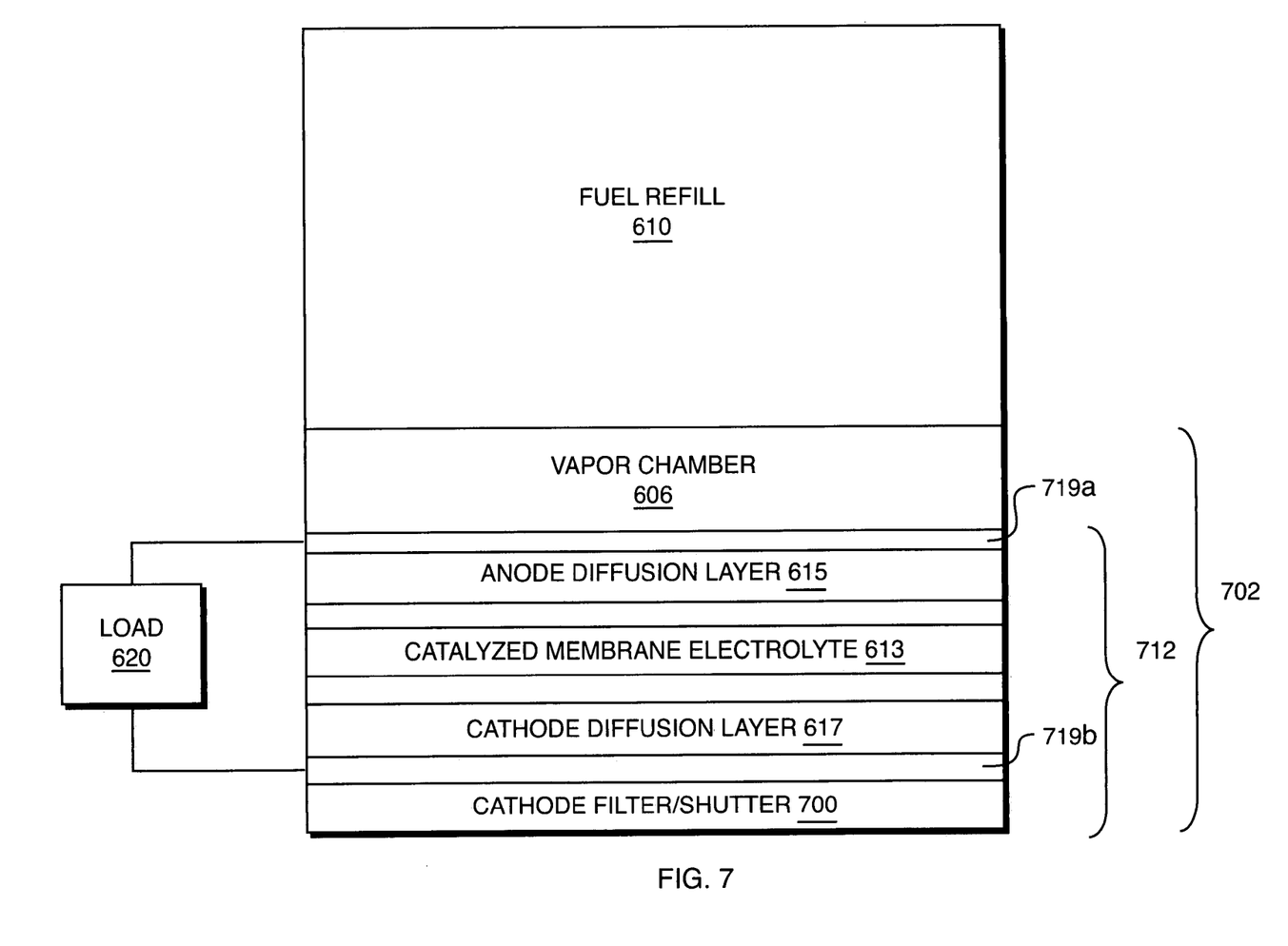
FIG. 7 is a schematic illustration of another embodiment of the present invention in which the shutter is contained on the cathode side of the fuel cell system.

Yet a further embodiment of the invention is illustrated in FIG. 7, in which like components are designated by the same reference characters as in FIG. 6A. In the embodiment of FIG. 7, the electrostatically-actuated shutter 700 of the present invention is placed on the cathode aspect of the fuel cell system 602 contiguous to the cathode filter 624. In this configuration, the shutter 700 functions to manage the water content in the area of the cathode of the fuel cell 612. As known to those skilled in the art, the membrane electrolyte 613 needs to be adequately hydrated in order to function properly. In the fuel cell system of FIG. 7, the shutter 700, when in a closed position maintains water in the cathode area in order to reduce the possibility of the membrane drying out. The shutter 700 can be then be opened in circumstances in which the cathode region contains sufficient water. If excess water builds up, the shutter can remain open longer in order to prevent cathode flooding. It may be further desirable to integrate the cathode shutter and the cathode filter into a single component for improved results such as to make it more open to change the permeability of oxygen and water vapor to the cathode and would be optimized for different environmental conditions.

It should be understood that the embodiments of FIGS. 6A, 6B and 7 can be combined in various ways. For example, it may be desirable to have a shutter in the fuel refill (FIG. 6B) so that it can remain closed when not connected to the fuel cell, and there may still be a need for shutter within the fuel cell system (FIG. 6A) in case it is used with a fuel source that is not controllable. As such, a shutter may be contained in both the refill and the fuel cell, and a shutter may also be contained on the cathode side as shown in FIG. 7, if desired in a particular application of the invention.

It should be further understood that the device and associated method of the present invention provide a solution for controlling vapor and gas flow throughout a fuel cell system without a mechanical actuators or motors required. In addition, there are no externally moving parts. The device is a comparatively low power solution for controlling the rate of fuel delivery to the anode aspect of the fuel cell, and for controlling air or oxygen entry into the cathode aspect. The device of the present invention further provides an improved seal against unwanted fuel and/or water leakage.

What is claimed is:

1. An electrostatically-actuated shutter for use with a fuel cell system, comprising:
   (A) a first electrode held at a first voltage said first electrode having at least one opening therein;
   (B) a second electrode held at a second voltage, that is different than said first voltage, and said second electrode having at least one opening therein;
   (C) a diaphragm disposed between said first electrode and said second electrode, said diaphragm having openings therein that correspond with the openings in said second electrode, and which do not correspond with the openings in said first electrode;
   (D) a driver coupled to said diaphragm that adjusts the voltage of said diaphragm such that when the driver sets a voltage for said diaphragm, the diaphragm is attracted to the fixed electrode having a different voltage, and when said diaphragm is drawn to said second electrode, its openings align with the openings of said second electrode to create apertures through which gases and vapors can flow;
   (E) an additional diaphragm of a configuration such that it seals over the openings of the electrode to which it is drawn when said driver applies a predetermined voltage to close the shutter; and
   (F) an exit port through which gases and vapors are delivered from said shutter, wherein said diaphragm and said additional diaphragm are each coupled to separate drivers that each apply a voltage to establish a predetermined voltage differential to draw its respective diaphragm to the desired electrode in order to open and close the shutter.

2. The electrostatically-actuated shutter as defined in claim 1 wherein said first fixed electrode is generally flat, and said second electrode is of a dome shape, and said diaphragm is held to the closed position without an applied voltage such that the shutter is normally closed.

3. The electrostatically-actuated shutter as defined in claim 1 wherein one or more of said diaphragms are substantially comprised of a dielectric material.

4. The electrostatically-actuated shutter as defined in claim 3 wherein one or more of said diaphragms are substantially comprised of a polyimide dielectric material.

5. The electrostatically-actuated shutter as defined in claim 3 wherein said diaphragm that is substantially comprised of a dielectric material further comprises a conductive layer embedded within said dielectric material and which is connected to an electrical driver circuit.

6. The fuel cell system with an electrostatically-actuated shutter assembly as defined in claim 1 wherein said shutter assembly is placed adjacent to a vapor chamber of one or more of said fuel cells to open and close the vapor chambers to control the flow of fuel to said one or more fuel cells.

7. The fuel cell system with an electrostatically-actuated shutter assembly as defined in claim 1 wherein said shutter assembly is placed adjacent to a cathode of one or more of said fuel cells to control the flow of oxygen to said one or more fuel cells.

* * * * *